June 11, 1946.  H. F. FARRANCE  2,401,920
MEASURING APPARATUS
Filed Oct. 6, 1943
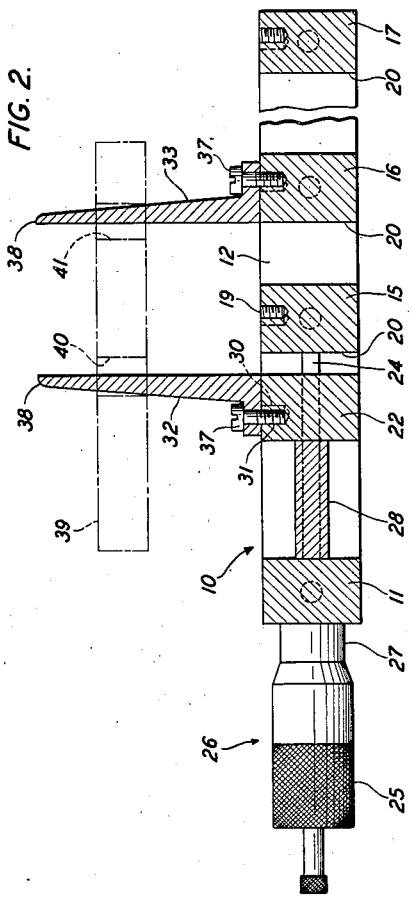
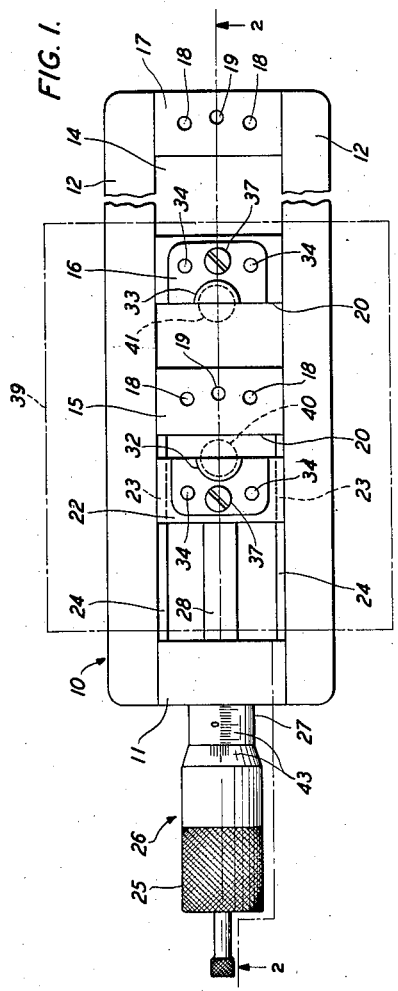
INVENTOR
H. F. FARRANCE
BY: E. R. Nowlan
ATTORNEY Patented June 11, 1946

2,401,920

UNITED STATES PATENT OFFICE 2,401,920

MEASURING APPARATUS

Harry F. Farrance, Jersey City, N. J., assignor to Western Electric Company, Incorporated, New York, N. Y., a corporation of New York Application October 6, 1943, Serial No. 505,127

4 Claims. (Cl. 33—165)

This invention relates to measuring apparatus, and more particularly to apparatus for measuring the distances between centers of holes in articles.

An object of the invention is to provide an apparatus which is simple in structure, highly variable, and accurate in measuring the distances between centers of holes in articles.

With this and other objects in view, the invention comprises a hollow body having bridges fixed at given spaced positions, a bridge movable by a micrometer relative to the fixed bridges, and a pair of measuring elements one mounted upon the movable bridge and the other upon any selected one of the fixed bridges and receivable in holes of an article for use in measuring the distances between the centers of the holes.

Other objects and advantages will be apparent from the following detailed description when considered in conjunction with the accompanying drawing, wherein Fig. 1 is a top plan view of the apparatus, and Fig. 2 is a longitudinal sectional view taken substantially along the line 2—2 of Fig. 1.

Referring now to the drawing, the apparatus includes a body, indicated generally at 10, including an end 11 disposed between and fixed to spaced sides 12, provided with an open space 14 therebetween. A plurality of like bridges, 15, 16 and 17, spans the space 14, with their ends fixed to the sides 12. In each of the bridges 15, 16 and 17 there are disposed spaced pin receiving apertures 18 and a central threaded aperture 19. The bridges are disposed so that their front or left surfaces 20 are like distances apart, these distances in the present instance being one inch.

A movable bridge 22 spans the space 14 between the sides 12 and has grooves 23 in the ends thereof to receive track portions 24 which are fixed to their respective sides 12. Through this construction the movable bridge 22 may be moved longitudinally of the body between the end 11 and the bridge 15. The means to move this bridge includes a movable member 25 of a micrometer unit 26, a fixed member 27 of the unit being secured in any suitable manner to the end 11. The movable member is connected to the movable bridge through an intermediate member 28. Pin receiving apertures 30, similar to the apertures 18, are disposed in the movable bridge 22 and a threaded aperture 31 is also disposed therein as illustrated.

Attention is now directed to the engaging elements 32 and 33. These elements are identical in structure and are provided with pins 34 fixedly disposed in apertures therein so as to be received in the pin receiving holes of any one of the bridges. Through the aid of screws 37, the elements 32 and 33 may be secured to the selected bridges, the screws being receivable in the threaded apertures 19 or 31. The elements 32 and 33, that is, the vertical portions thereof, are hemicylindrical in cross-section. This is true regardless of whether the cross-section may be taken except at rounded upper ends 38, so that the distances between centers of holes of various diameters may be measured. With the present illustration it is necessary that during one measuring operation, the holes be of like diameters so that when an article such as indicated at 39, with spaced holes 40 and 41, is disposed on the elements, the article will be parallel with the body 10.

During the measuring operation, let it be assumed that the required distance between the centers of the holes 40 and 41 is known. The apparatus may then be set up with the elements 32 and 33 that known distance apart. In the present illustration the centers of the holes are more than an inch apart, and by adjusting the micrometer unit 26, the element 32 may be moved relative to the element 33 until they are conditioned to be receivable in the holes 40 and 41. Further adjustment may be made, moving the element 32 toward or away from the element 33 until the holes in the article find their like radial portions on the elements. At this time the inner edges of the elements 32 and 33, which are aligned with the measuring edges of the bridges upon which they are mounted, lie at the center lines of the holes 40 and 41. By knowing the distance between the surfaces 20 of the bridges 15 and 16, the distance between the centers may be determined by adding to this distance the amount registered on the micrometer unit 26 through the aid of graduations 43. If a plurality of articles 39 having like holes disposed therein supposedly the same distance apart as the holes 40 and 41 are to be measured, the elements 32 and 33 may remain at the adjusted positions and if this distance is correct, the subsequent measurements of the centers of the holes should require no further adjustment. However, if there should be any variation between the centers of the holes from that preferred, the extent of this variation may readily be determined by the micrometer unit.

It should be apparent that through the tapered contours of the elements, holes of various diameters may be measured, and through the formation of the elements identical throughout, they may be mounted at will in any given order, one upon the movable bridge and the other upon any of the remaining fixed bridges.

Although specific improvements of the invention have been shown and described, it will be understood that they are but illustrative and that various modifications may be made therein without departing from the scope and spirit of this invention as defined by the appended claims.

What is claimed is:

1. An apparatus for measuring the distance between centers of apertures in an article comprising tapered elements semi-circular in cross-section receivable in apertures of various diameters in an article and having flat faces to lie at the centers of their respective apertures, and means to measure the distance between the flat faces of the elements.

2. An apparatus for measuring the distance between centers of apertures in an article comprising tapered elements semi-circular in cross-section receivable in apertures of various diameters in an article and having flat faces to lie at the centers of their respective apertures, means to cause relative movement of the elements to position them to enter the apertures, and means to measure the distance between the flat faces of the elements.

3. An apparatus for measuring the distance between centers of apertures in an article comprising tapered elements semi-circular in cross-section receivable in apertures in an article and having flat parallel faces to lie at the centers of their respective apertures, a measuring unit adapted to cause relative movement of the elements until they are receivable in the said apertures and the flat faces find the centers thereof, and means to indicate the distance between the flat faces of the elements.

4. An apparatus for measuring the distance between centers of apertures in an article comprising a body having supporting portions disposed measured distances apart, an element adapted for fixed mounting at any selected one of the supporting portions and having a tapered semi-circular contour with a longitudinally extending flat face, a movable element having a tapered semi-circular contour with a longitudinally extending flat face, a member movably carried by the body to support the movable element with its flat face parallel with the flat face of the fixed element, a micrometer unit carried by the body and operatively connected to the member to move it with its element relative to the fixed element until the elements are receivable in apertures of an article and the parallel flat faces of the elements are positioned at the centers of their apertures, and means to indicate the distance between the centers of the apertures.

HARRY F. FARRANCE.